United States Patent

Sims et al.

[11] Patent Number: 6,062,730
[45] Date of Patent: May 16, 2000

[54] COMFORT GUARD

[75] Inventors: Paula Gaye Sims; Barry Todd Wilkerson, both of Leitchfield, Ky.

[73] Assignee: Paula G. Sims, R.D.H., Leitchfield, Ky.

[21] Appl. No.: 09/062,770

[22] Filed: Apr. 20, 1998

[51] Int. Cl.[7] .............................. A61B 6/14; G03B 42/04
[52] U.S. Cl. ............................................. 378/168; 378/169
[58] Field of Search ................................. 378/168, 169, 378/170

[56] References Cited

U.S. PATENT DOCUMENTS

| | | | |
|---|---|---|---|
| 1,453,194 | 4/1923 | Shaw | 378/170 |
| 1,537,925 | 5/1925 | Bolin | 378/169 |
| 1,631,497 | 6/1927 | Marler | 378/169 |
| 3,609,358 | 9/1971 | Salesi | 378/205 |
| 4,847,884 | 7/1989 | Dove | 378/168 |
| 4,852,143 | 7/1989 | Scheier et al. | 378/168 |
| 4,913,288 | 4/1990 | Tanaka | 378/169 |
| 5,044,008 | 8/1991 | Jackson | 378/168 |
| 5,256,982 | 10/1993 | Willis | 378/168 |
| 5,289,522 | 2/1994 | Kanbar et al. | 378/170 |
| 5,625,666 | 4/1997 | Willis | 378/167 |
| 5,784,433 | 7/1998 | Higa | 378/168 |
| 5,799,058 | 8/1998 | Willis et al. | 378/168 |

*Primary Examiner*—David P. Porta
*Assistant Examiner*—Drew A. Dunn

[57] ABSTRACT

The Comfort Guard is made of a soft material that covers the stiff, slender and sharp edges of an intraoral x-ray film, during dental x-ray exposures. After the intraoral x-ray film is inserted or affixed into the Comfort Guard, the guard is positioned in the patient's mouth in between the teeth and tongue. Therefore, the film's edges will not be in direct contact with the patient's mouth or oral tissue. The patient can compress the handle with their anterior teeth, allowing the patient to become involved in securing the film in their mouth.

3 Claims, 2 Drawing Sheets

COMFORT GUARD

CROSS-REFERENCE TO RELATED APPLICATION

Not applicable.

STATEMENT REGARDING FEDERALLY SPONSORED RESEARCH OF DEVELOPMENT

Not applicable.

BACKGROUND OF THE INVENTION

This invention relates to a disposable intraoral x-ray film guard that can be used during dental intraoral x-ray exposures. An intraoral x-ray film is thin, and has stiff edges that can actually penatrate oral tissue. Thus, causing discomfort to many patients and sometimes even bleeding will occur. The Comfort Guard incases or covers the film's edges; therefore, the film's edges will not directly touch the patient's mouth or oral cavity. The Comfort Guard's handle can serve as a holding device for the patients who need comfort with apprehension of swallowing the x-ray film. Intraoral x-ray film sizes are available for pedo (child), adult, periapical (roots), and occlusal (alternate survey). Hence, different Comfort Guard sizes can be made to accommodate all intraoral x-ray film sizes.

BRIEF SUMMARY OF THE INVENTION

This invention is directed to a guard that covers an intraoral x-ray film's edges, during dental x-ray exposures. The object of the present invention is to reduce discomfort for the patients, and aid in more tolerable methods of intraoral x-ray procedures.

The Comfort Guard can be made of a soft material, examples could include; paper, cotton, sponge, plastic, foam- rubber, or rubber. The guard covers or incases the x-ray films edges, thus, the edges will not be indirect contact with the patient's mouth.

BRIEF DESCRIPTION OF THE DRAWING VIEWS

DETAILED DESCRIPTION OF THE INVENTION

Referring to FIGS. 1–4, the body casing 5 is to be made of any non-toxic material that does not distort the x-ray image. Examples of such materials are: paper, cotton, sponge, foam-rubber, rubber,and plastic. However, any material that could be approved by Food and Drug Administration will suffice. Referring to FIGS. 1–4, the body casing 5 will house the intraoral x-ray film and prevent the stiff, slender and sharp edges of the film from touching the patient's mouth and oral cavity during x-ray procedures. Opposing the original method of the film being inserted into the patient's mouth with no protection from the stiff and rough edges. In FIGS. 1–4, the shape of the body casing 5 can be made in varies styles, such as rectangular, triangular, round, or even square shapes, just so the edges of the film are covered.

Figure 4:
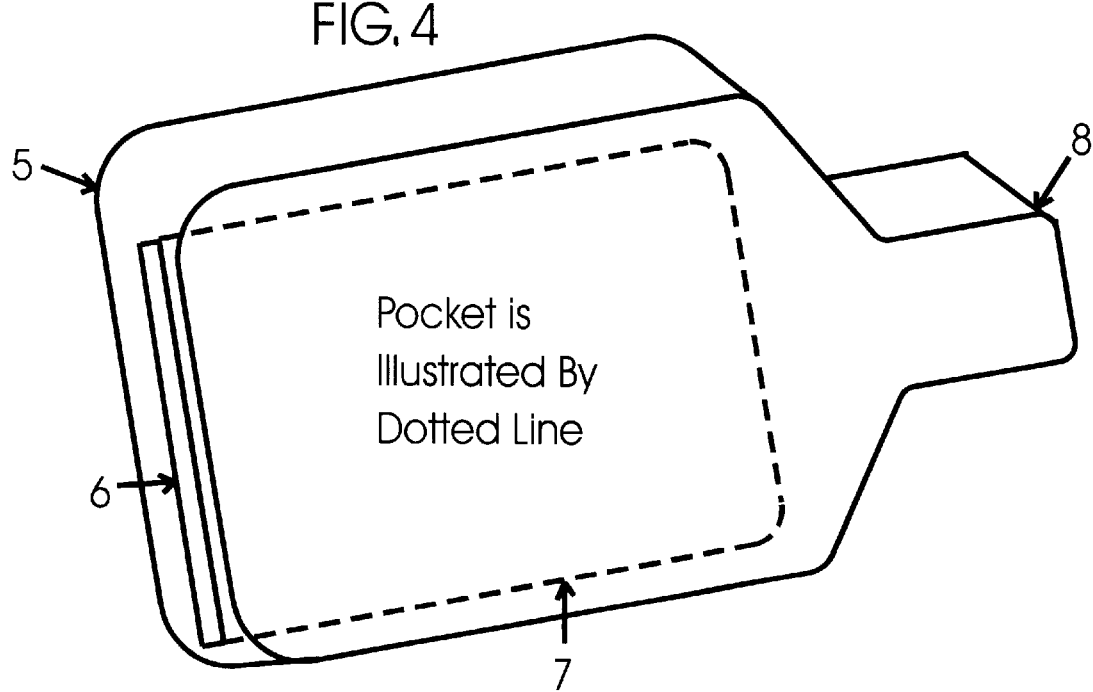
FIG.4 is the end view of a Comfort Guard that totally incases an intraoral x-ray film. (Film is inserted into pocket).

Referring to FIG. 4, the x-ray film pocket slot 6 is designed as an insertion slot for the x-ray film. Movement of the x-ray film is controlled by the x-ray film sized pocket 7, referring to FIG. 4. The x-ray film pocket slot 6, of FIG. 4, and the x-ray film sized pocket 7 is designed to fit the exact sizes of either the child(pedo), adult, periapical and occlusal x-ray films.

Figure 1:
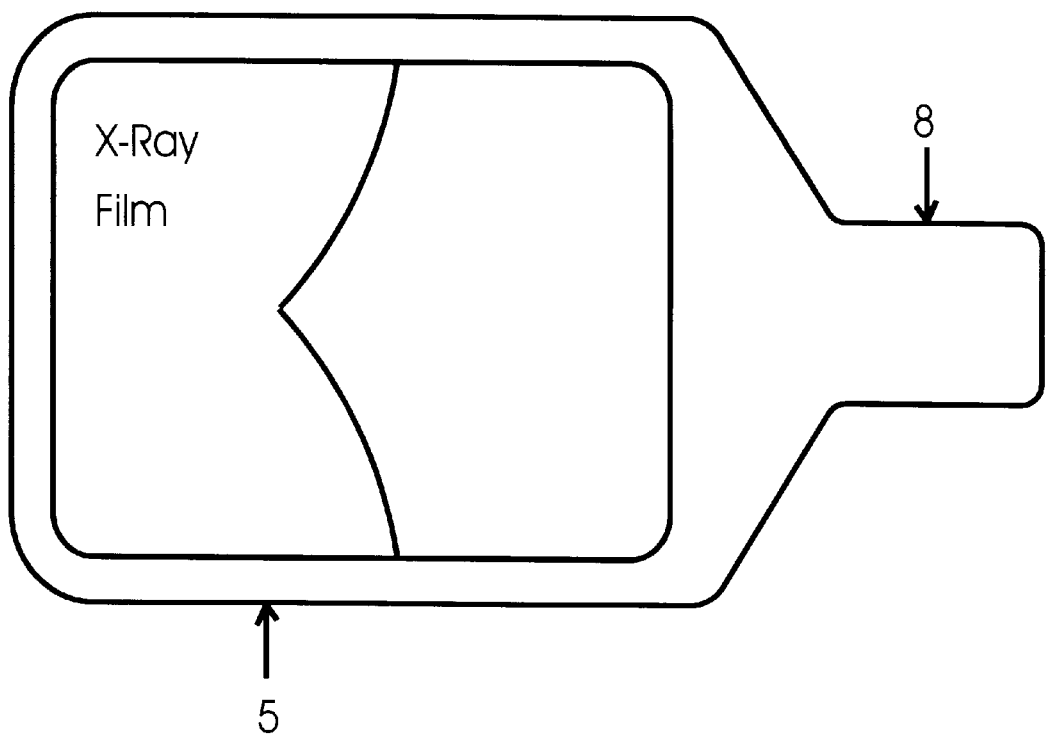
FIG.1 is the top view of a Comfort Guard that covers only the edges of an intraoral x-ray film. (Film is affixed to guard).
Figure 2:
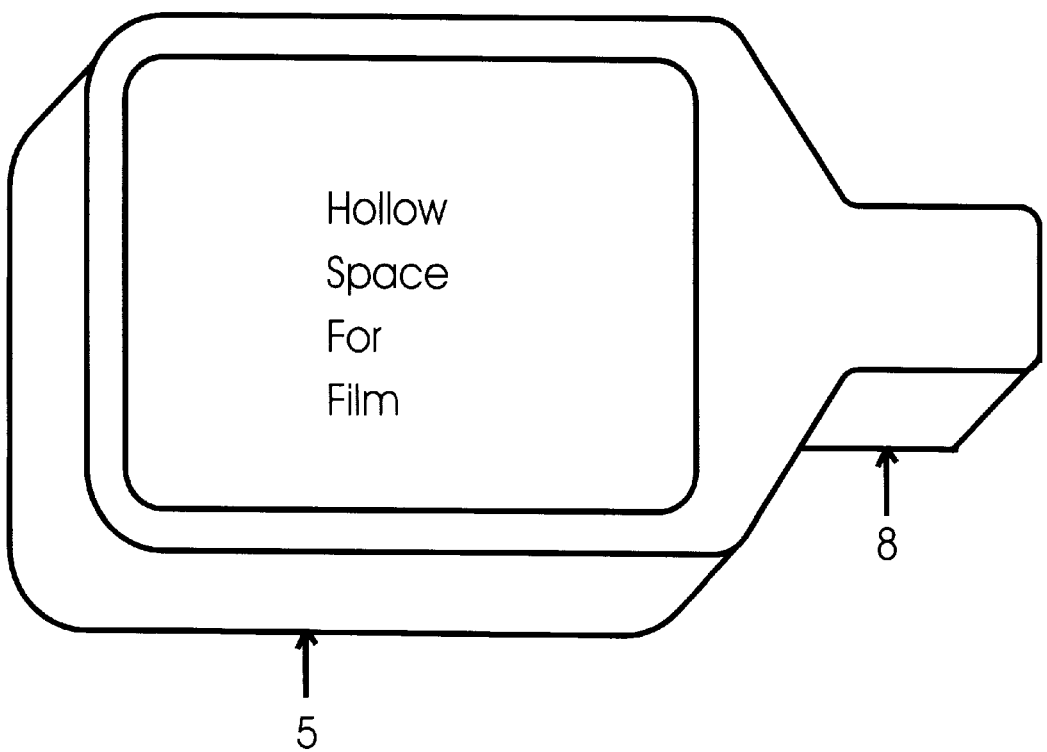
FIG.2 is the perspective view of a Comfort guard that covers only the edges of an intraoral x-ray film. (Hollow space for film).
Figure 3:
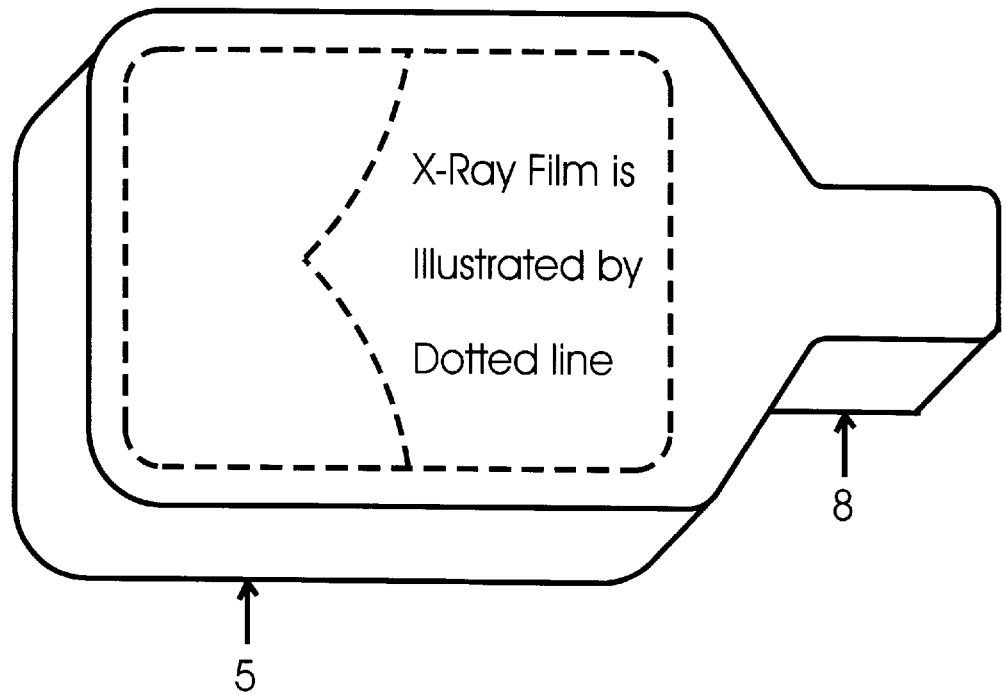
FIG.3 is the perspective view of a Comfort Guard that totally incases an intraoral x-ray film. (Film is affixed inside guard).

The Comfort Guard can be made in different styles. FIGS. 1 and 2 referres to a style that only covers the x-ray film edges. FIGS. 3 and 4 referres to a style that totally encases the x-ray film. However, FIGS. 1 and 3, can be constructed with film affixed to the Comfort Guard. And, FIGS. 2 and 4 are to be manufactured without the film. FIG. 2 has a hollow space for the film placement and FIG. 4 has a pocket 7 for film insertion. The process of making these style may consist of a cast, mold or cut form, depending on the desired material choosen.

In FIGS. 1–4, referres to the handle which is to be used as holding device for the patient and the operator can use the handle 8 to help guide the film into the patient's mouth. After insertion of the film, the patient can then hold the handle 8 themselves, in order to aid in control of movement of the film. This procedure can be easily achieved because the guard is positioned inside the patient's mouth in between the tongue and teeth; thus, the handle 8 of FIGS. 1–4, should be made of a soft absorbent material, that is suitable and approved by F.D.A. Therefore, the patient can tightly compress the handle 8 with their anterior teeth in order to control movement to the film guard. The presently existing self-adhesive tabs that are used to stablize the intraoral x-ray film, can be used with the Comfort Guard. The adhesive will adhere to the guard therefore, both the handle 8, and the self-adhesive tab can be used to aid in stablization of the x-ray film. During dental intraoral x-ray procedures, unusual salivation generally occurs. Many patients find swallowing a problem and fear choaking. Therefore, an absorbent Comfort Guard could be a great comfort for those patients.

We claim:

1. A disposable soft moisture absorbent intraoral X-ray film guard comprising:

a body for totally encasing an intraoral dental X-ray film, said body comprising a posterior and an anterior side and having a distal and a proximal end;

a vertical slot positioned in said distal end and sized to form a friction fit between said body and said intraoral dental X-ray film; and an undetachable integrally formed handle connected to said body at said proximal end, wherein said handle is sized to extend past the anterior teeth of a patient allowing said patient to grasp said handle.

2. The disposable soft moisture absorbent intraoral dental x-ray film guard of claim 1 wherein said disposable soft moisture absorbent intraoral dental x-ray film guard is a sponge.

3. The disposable soft moisture absorbent intraoral dental x-ray film guard of claim 1, wherein said handle is sized to be compressible with said patient's anterior teeth while said patient grasps said handle.

* * * * *